July 2, 1957
N. J. SMITH
2,798,211
SEISMIC PROSPECTING METHOD AND APPARATUS
Filed April 15, 1954
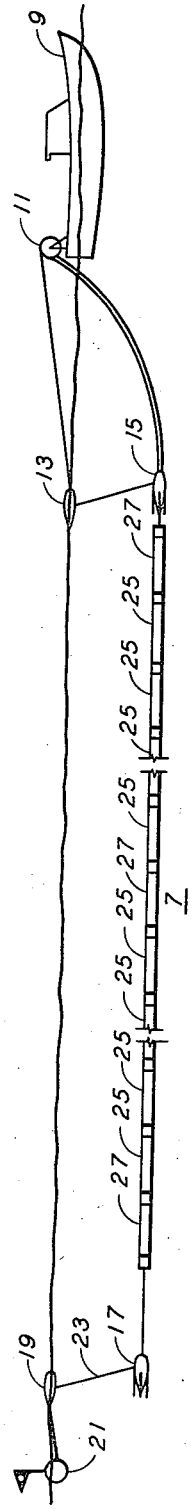
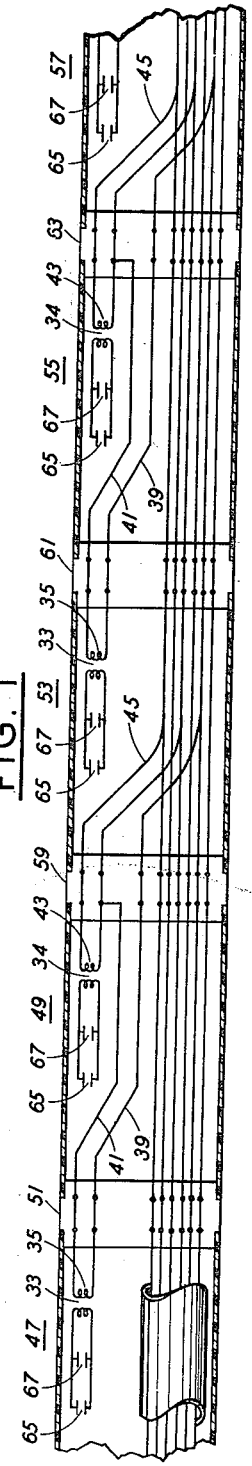
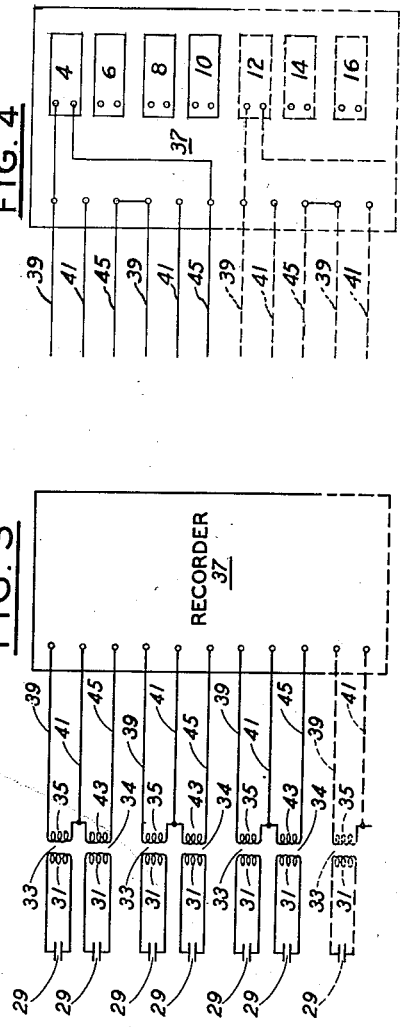
INVENTOR
NEAL J. SMITH
ATTORNEYS

United States Patent Office

2,798,211
Patented July 2, 1957

2,798,211

SEISMIC PROSPECTING METHOD AND APPARATUS

Neal J. Smith, Houston, Tex., assignor to California Research Corporation, San Francisco, Calif., a corporation of Delaware Application April 15, 1954, Serial No. 423,355

2 Claims. (Cl. 340—17)

My invention relates to seismic prospecting, and particularly to a method of prospecting over submerged areas having varied bottom terrain and varied types of geologic structure.

According to conventional offshore seismic exploration methods, an arrangement of detectors is placed in the water to detect seismic waves reflected from subterranean formations. The final recording may consist of a small number of traces (for example, 12), but the signal for each trace may be generated by a large number of detectors connected in parallel. At times, it has been found desirable to record in a single trace signals received by detectors spaced over an extended distance in order to cancel out noise generated by irregularities at the bottom of the sea or by inhomogeneities in shallow strata. In areas of steep dip, however, it is found that such an arrangement is not satisfactory because a wave front of the seismic signal does not actuate all of the detectors in a group at the same time. The electrical signals from one end of a group of detectors may cancel electrical signals from the other end of the group in such a way that the usable seismic signal is distorted and obscured on the seismic trace. I have found that it is generally impossible to forecast the optimum method by which the detectors should be grouped and their signals mixed to obtain the maximum amount of information from a prospect. The degree of mixing is a measure of the number of individual detectors which are connected in parallel and, consequently, of the length of the detector array that contributes to a given trace. Generally, preliminary seismic survey work must be performed in order to determine the extent to which mixing must be employed to improve the usefulness of the record. Accordingly, I provide apparatus by which a survey may be made employing a large number of seismic traces. If mixing is desired, the mixing connections are made at the recorder. According to such an arrangement, the operators on a recording boat may change the degree of mixing among the signals from seismic detectors rapidly in accordance with their judgment as to the optimum record quality. Such a decision is made after viewing seismic records during the course of the seismic survey. In apparatus according to my invention, a number of sections of seismic cable are employed. The pressure detectors in each cable section provide signals to an impedance matching transformer. One output terminal of each transformer is connected to a ground which is common to another impedance matching transformer. Thus, there are three output wires from each two groups of pressure detectors.

The novel features of my invention are set forth with more particularity in the accompanying claims. The invention itself, however, with respect to the details thereof, together with its additional advantages, may be better understood from the following description of a specific embodiment with reference to the accompanying drawing, in which:

Fig. 1 shows a seismic cable in position to be used;

Fig. 2 shows a schematic wiring diagram for a seismic prospecting cable according to my invention;

Fig. 3 shows schematically the arrangement of the wiring within a seismic cable; and Fig. 4 shows schematically an arrangement for recording and mixing.

As shown in Fig. 1, a seismic cable 7 is towed behind a boat 9. A reel 11 on the boat 9 is attached to a buoy 13 and a paravane 15. The paravane is attached to the cable 7 and arranged to maintain a constant depth below the surface of the water. A second paravane 17 at the other end of the cable 7 maintains the rear end of the cable at a constant level below the surface. Rear buoy 19 and marker buoy 21 are attached to the rear paravane 17 by a cable 23 which has a length determined by the depth at which the cable 7 is to be towed. The cable itself consists of a number of active detector sections 25 and a number of inactive sections 27. The sections 25 contain pressure detectors which are adapted to detect pressure variations in the water. The inactive sections 27 contain conductors which transmit signals from the detectors.

In operation, the cable is reeled out on the reel 11 when the boat 9 is in the vicinity which is to be explored. The paravanes 15 and 17 are located at the desired depth below the surface of the water. The boat 9 moves over the prospect at a slow rate of speed and a charge of explosive is detonated near the center of the cable 7. The inactive section 27 at the center of the cable serves to separate active sections 25 from the immediate vicinity of the shot in order to avoid having the explosive damage the pressure detectors. The inactive sections 27 at the ends of the cable serve as terminations for the cable. Signals from the pressure detector are transmitted through a cable to the boat 9, where they are recorded. The pressure signals from each active section 25 of the cable 7 may be recorded separately, or signals from the various sections 25 may be mixed and recorded.

According to the preferred practice of my invention, piezoelectric crystals are employed as pressure detectors in each active section of the cable. In Fig. 2, I have shown these detectors as capacitors 29. Each detector 29 may be a group of pressure detectors which is connected to the primary 31 of an impedance matching transformer 33. The secondary 35 of the first transformer 33 is connected to the recorder 37 by one conductor 39 and by a ground 41. The secondary 43 of the second transformer 34 is connected to the recorder 37 by one conductor 45 and the ground 41. There is one ground connection from each pair of transformers in the seismic cable. Thus, the secondary of each impedance matching transformer 33 has one conductor connected directly to the recorder and one conductor which is common to two transformer secondaries, the common conductor being also connected to the recorder. Thus, for each pair of impedance matching transformers, there are three conductors leading to the seismic recorder 37. The number of groups of seismic detectors which may actuate separate recording circuits in recorder 37 is limited only by the number of conductors which may be employed in the cable.

According to the prior art practice of which I am aware, a group of detectors is connected to the primary of an impedance matching transformer. The secondary of each impedance matching transformer is connected directly to the recorder, and there is no common conductor between two impedance matching transformers. Thus, two wires are required to carry the signal from each group of seismic detectors. I have found that it is impractical to fabricate a seismic cable having a large cross-sectional area. Further, it is desirable that the seismic cable be reeled onto the drum 11 when not in use;

and, if the seismic cable has a large cross-sectional area, its stiffness increases and its weight increases so that the cable is difficult to handle and difficult to reel onto such a drum. If, for example, forty-eight traces are to be recorded separately for each seismic shot, ninety-six conductors are required under the conventional practice. Prior art devices of which I am aware have met the problem of providing a cable with a sufficiently small cross-section to provide easy handling by employing extensive mixing and thereby limiting greatly the number of traces recorded. For example, one of such prior art patents teaches the use of a six-trace recording employing mixing over a large distance. According to the above-described wiring arrangement, only seventy-two conductors are needed for a forty-eight-trace recording. Thus, the dimensions of the cable are maintained within a reasonable range and yet the seismic recording arrangement is highly versatile. According to the preferred practice of my invention, the seismic cable has a uniform cross-section through its entire length. The outside diameter of my cable is 2⅜ inches. The active elements of the cable are protected by an artificial rubber tube having a 3/16-inch thickness. There are seventy-two conductors throughout the length of the cable. According to my wiring arrangement, it is possible to record forty-eight separate seismic traces. In areas where greater mixing is desired, the conductors from the impedance matching transformers are connected together and the signals from the detectors mixed to provide a smaller number of traces.

Fig. 3 shows schematically the internal arrangement of a cable according to my invention. An active section of cable 47 is connected to a second active section of cable 49 by a connector 51. The active sections 49, 53, 55 and 57 are connected together by the connectors 59, 61 and 63. In order to assure interchangeability of the cable sections, each section contains seventy-two conductors. In the cable section 47, seventy of the conductors are grouped together. Two conductors are connected from the detectors 65 and 67 to the impedance matching transformer 33. The secondary 35 of the impedance matching transformer is connected by two conductors to the connector 51. In the cable section 49, the conductors 45 and 41 lead from the secondary 43 of the impedance matching transformer to the connector 59. The conductor 41 is connected to the impedance matching transformer 33 in the cable section 47, and the conductor 39 passes through the section 49 to the connector 59. The detectors 65 and 67 in the section 49 provide a signal for the impedance matching transformer 34. Cable sections 53 and 57 are similar to section 47. Cable section 55 is similar to cable section 49. Such an arrangement continues throughout the length of the cable so that at the recording end of the cable there are three conductors for each two detector sections. The number of detectors 65 and 67 in each detector section is determined by the sensitivity of the detectors. The detectors may be grouped together in a close array so that they detect signals from a minimum subterranean area.

Fig. 4 shows an alternative wiring arrangement in which signals from groups of detectors are mixed. The wiring arrangement in Fig. 2 is such that conductors 39 and 41 are connected to separate recording channels of the recorder 37. The four conductors 39 are respectively connected to one terminal of four respective recording channels. The four conductors 41 are respectively connected to the other terminals of the four respective recording channels. The four conductors 41 are also connected respectively to one terminal of respective ones of a second group of four other recording channels. The four conductors 45, one of which is not shown in Fig. 2, are connected respectively to the other terminals of the second group of four recording channels.

In Fig. 4 a different wiring arrangement is used. Seven recording channels, 4, 6, 8, 10, 12, 14 and 16 are shown. These are the seven recording channels to which the conductors 39, 41 and 45 shown in Fig. 3 may be connected. Fig. 3 does not show the recording channels separately. In Fig. 4, signals from groups of detectors are mixed so that only two of the seven recording channels are in use. The common conductors 41 between the transformers 35 and 43 are insulated from the recording circuit. The recording circuit 4 is connected across the transformer secondaries 35 and 43 associated with four detector groups. The recording channel 12 is connected across the transformer secondaries associated with four other detector groups. Such an arrangement provides mixing of the signals from the four detector groups 29.

In operation, then, the recorder may be so arranged that it shows a single trace for each detector section. Such an arrangement is useful in areas of high dip or in which, for other reasons, it is desired to minimize the subterranean area from which the signals are to be mixed. If the bottom of the sea is broken and irregular, if the rock layers are heterogeneous so that seismic wave fronts are distorted, or if for another reason it is desired to employ more mixing, the conductors may be connected together at the recorder so that there is a smaller number of traces, and signal mixing is performed so that one recorded trace presents a mixture of signals which are reflected from a larger area of the subterranean formation. Thus, I have provided a highly versatile seismic recording arrangement which permits the operators to vary over a wide range the amount of mixing which is performed before recording.

I have explained my invention as a single preferred embodiment. I realize, however, that many modifications or variations of the described apparatus may be made by one skilled in the art without departing from the scope of my invention. I do not intend therefore to limit my invention except as set forth in the appended claims.

I claim:
1. For use in recording signals from a seismic cable which is adapted to be towed through water while in use and reeled on a drum when not in use, the combination comprising a first plurality of pressure detectors connected to the primary of an impedance matching transformer, a second plurality of pressure detectors connected to the primary of a second impedance matching transformer, a pair of conductors connected to the secondary of each of said transformers, means connecting said pair of conductors from said secondary of said first transformer to a recorder, means connecting one of said conductors from said secondary of said second transformer to said recorder, means connecting the other of said conductors from said second transformer to one of said conductors on said secondary of said first transformer and to said recorder.

2. For use in recording signals from a seismic cable which is adapted to be towed through water while in use and reeled on a drum when not in use, the combination comprising a first pressure detector connected to the primary of an impedance matching transformer, a second pressure detector connected to the primary of a second impedance matching transformer, a pair of conductors connected to the secondary of each of said transformers, means connecting said pair of conductors from said secondary of said first transformer to a recorder, means connecting one of said conductors from said secondary of said second transformer to said recorder, means connecting the other of said conductors from said second transformer to one of said conductors on said secondary of said first transformer and to said recorder.

References Cited in the file of this patent

UNITED STATES PATENTS

| | | |
|---|---|---|
| 2,465,696 | Paslay | Mar. 29, 1949 |
| 2,509,651 | Olson | May 30, 1950 |
| 2,599,064 | Minton | June 3, 1952 |
| 2,623,113 | Bayhi et al. | Dec. 23, 1952 |
| 2,661,464 | Wolf | Dec. 1, 1953 |